UNITED STATES PATENT OFFICE.

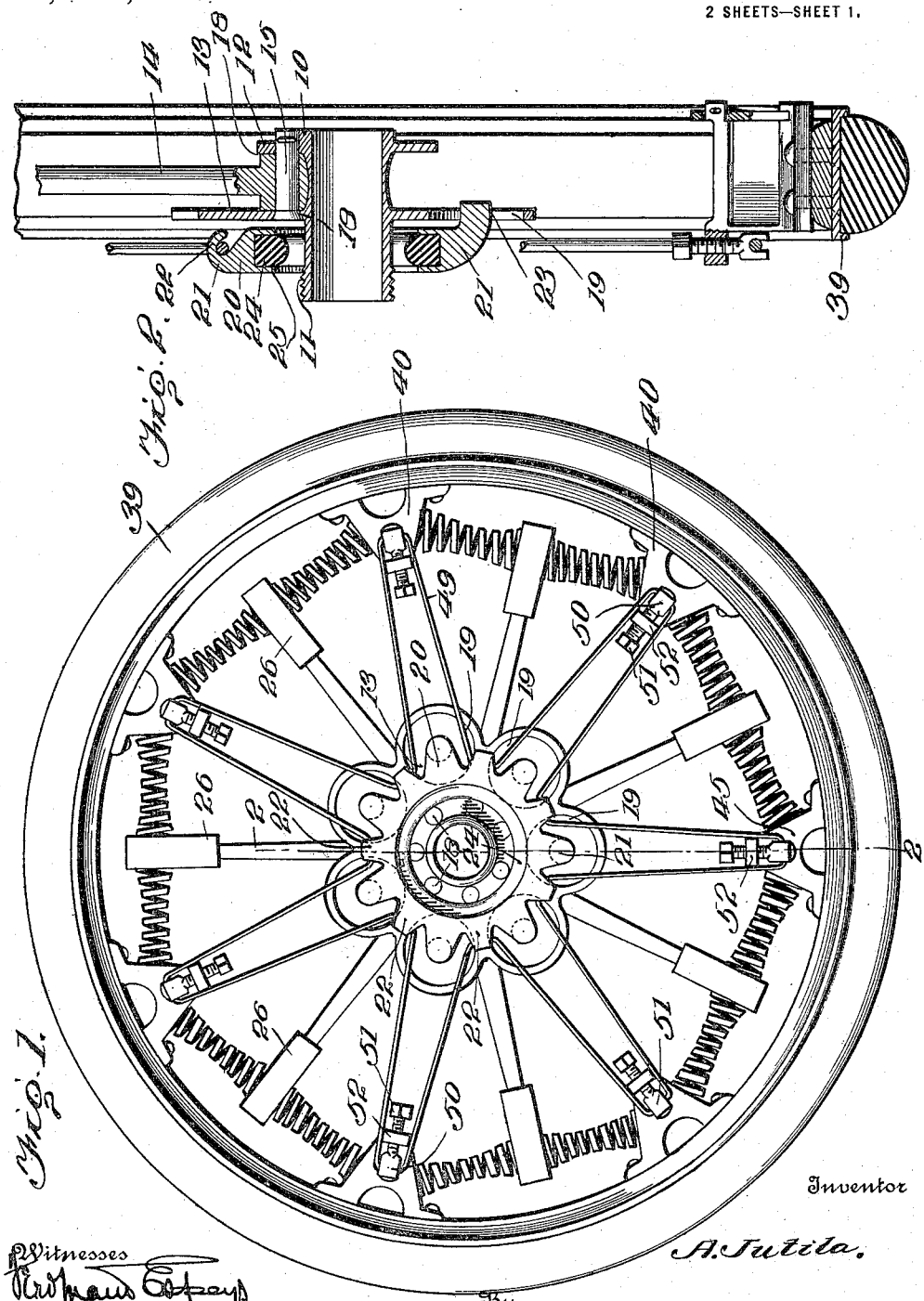

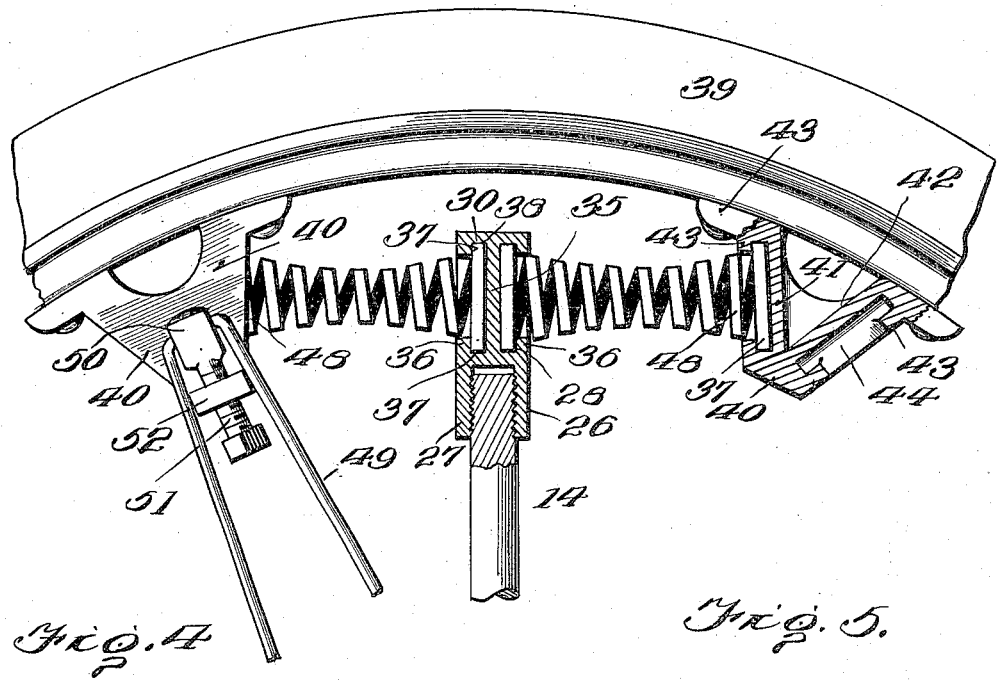

ARTTURI JUTILA, OF ORR, MINNESOTA.

RESILIENT WHEEL.

1,155,246.

Specification of Letters Patent. Patented Sept. 28, 1915.

Application filed June 25, 1913. Serial No. 775,761.

*To all whom it may concern:*

Be it known that I, ARTTURI JUTILA, a subject of the Czar of Russia and Grand Duke of Finland, residing at Orr, in the county of St. Louis and State of Minnesota, have invented certain new and useful Improvements in Resilient Wheels, of which the following is a specification.

This invention relates to an improvement in resilient wheels.

The primary object of the present invention is to improve the construction shown in my patent granted the 8th day of August, 1911, No. 1,000,013.

Broadly the above mentioned patent covers a hub, from which projects a plurality of spokes, and a rim provided with brackets disposed to extend between the spokes of the hub, there being springs connecting the terminals of the spokes with the brackets to cushion the hub as the load is applied.

The present invention is designed to improve particularly the construction and arrangement of the resilient connection between the spokes and the rim, whereby a more perfect cushioning of the hub is provided.

A further object of the invention is to provide a construction which, when used on the drive wheels of motor vehicles, will not become disarranged or distorted when power is applied to the axle on which the wheel is mounted.

A still further object of the invention is to so construct the spring members, which constitute the cushioning means, that while they will effectually cushion the spokes in their movement with respect to the hub, they will be sufficiently strong to withstand the pressure exerted on them.

Another object of the invention is to provide an attaching means for the springs whereby they may be interchanged without disassembling the wheel.

For a full understanding of the invention, reference is to be had to the following description and accompanying drawings, in which:—

Figure 1 is a side elevation; Fig. 2 a section taken on the line 2—2, certain of the parts being omitted to more clearly bring out the construction and arrangement of the ring which embraces the hub and which has a flexible connection with the rim; Fig. 3 a detail view showing the arrangement of the springs; Fig. 4 a transverse section through the rim showing the manner in which the springs are supported thereon; and Fig. 5 a detail view of the spring supporting member which is secured to the spokes.

Corresponding and like parts are referred to in the following description and indicated in all the views of the accompanying drawings by the same reference characters.

In the drawings, 10 designates a hub which is formed with the axle receiving portion 11 and the spaced flanges 12 and 13. The spokes 14 are pivotally mounted between the flanges 12 and 13, bolts 15 passing through the flange 13 and the terminals of the hub, the flange 13 constituting a plate. The bolts 15 pass through apertures 18 in the flange 13, the heads of said bolts contacting with the flange. The terminals of the bolts which project through the flange 12 receive cotter pins. It will be noted by this construction that by removing the cotter pins, the spokes 14 may be removed from the hub.

The periphery of the flange 15 is scalloped and provided with a series of apertures 19. A ring 20 is supported in a manner hereinafter described adjacent the flange 13, said ring being formed with a plurality of radial extensions 21. These extensions are alternately provided with hooks 22 and studs 23, the studs 23 being disposed to enter the apertures 19 of the flange 13, thereby restricting the movement of the ring. The inner face 24 of the ring 20 is provided with a groove in which is seated an annular rubber cushion 25.

Arranged on the outer terminal of each of the spokes is a housing 26. This housing is substantially rectangular and provided with an extension 27 formed with a threaded bore which receives the terminal of the spoke. The housing comprises a base plate 28 from which extends at right angles a side plate 29, there being a top plate 30 disposed parallel with the plate 28. The side wall 31 of the housing is removable, being formed with an aperture receiving an extension 32 carried by the base plate, a cotter pin being inserted through said extension to support the side wall 31 against removal. The top of the housing is formed with a flange 33 beneath which the edge 34 of the plate 30 extends, the plate in this manner being effectually held against displacement.

A web 35 connects the upper and lower plates of the housing, said upper and lower plates being provided with flanges 36. A plurality of coiled springs are supported on each side of the housing, said springs being of greater diameter at their terminals than at their centers. The springs terminate in plates 37 which are inserted in the guide-ways 38 of the housing formed by the flanges 36, the plate 37 preventing the displacement of said springs. In the drawings, each housing supports four springs, two on each side. It will be noted, however, that when the wheel is used for heavy trucks, the length of the housings may be increased and any number of springs employed.

The rim 39 which may be of any suitable construction, and on which may be supported a metallic or cushion tire, is provided at intervals throughout its circumference with spring supporting devices 40. These devices consist of brackets, there being a bracket disposed between each pair of spokes. The brackets are substantially V-shaped in end elevation and comprise converging plates 41 and 42 provided with flanges 43 which are secured to the rim. Guide-ways 44 are formed on each of the plates. the guideways extending entirely across the plates and being closed at one end. A plate 45 is secured to the bracket at the open ends of the guideways, closing the guideways, one edge of the plate being supported by lugs 46 formed integral with the bracket. A lug 47 extends from the bracket and projects through the plate adjacent its edge remote from the lugs 46, a cotter pin extending through the lug 47 and supporting the plate 45 against displacement. The terminals 48 of the springs are supported by the brackets 40, the plates 37, which are either formed integral with or secured to the springs, being inserted within the guide-ways 44. Thus the springs are interposed between the spokes and the rim, the spokes in their movement when the load is applied being cushioned and relieving the jar on the hub.

In wheels of this character where springs are interposed between the rim and hub, the wheels when applied to the driving axle of a vehicle become distorted when power is applied to the axle. In order to prevent the displacement of the springs in the present construction, the outer rim is connected to the ring 20 by a steel wire 49. This wire 49 is passed beneath the hooks 22 of the ring 20 and drawn outwardly toward the rim, the loops thus formed passing through the enlarged terminals 50 of screws 51. The screws 51 are mounted in the lugs 52 carried by the brackets 40, and the tension of the wire may be regulated by adjusting the screws 51. It will thus be noted that the ring 20 will be supported adjacent the hub and restricted in its movement by the flange 13, the projections 23 which extend through the openings 19 of the flange guiding the ring in its movement. The cushion 25 when the ring is moved with respect to the hub contacts with the hub and takes up jar that might occur.

It will be noted by this construction that when the wheel is arranged on the drive-shaft of a motor vehicle and power is applied, the outer rim will not rotate with respect to the hub to an extent which would distort or displace the springs, the means by which this is accomplished, however, being such as not to interfere with the cushioning action of the springs.

The many advantages of a construction of this character will be clearly apparent as it will be noted that while the hub is effectually cushioned when the load is applied or when the rim contacts with an obstruction the cushioning means is such as not to be distorted when power is applied to the shaft on which the wheel is mounted. It will also be seen that the structure may be easily and economically manufactured and that the springs may be readily replaced should they become worn or damaged. Attention is called to the fact that the entire structure is such that the various parts may be readily assembled.

What I claim is:

1. A resilient wheel including a hub, spokes supported by the hub, a rim, springs interposed between said spokes and rim, a member embracing the hub and spaced therefrom, and a substantially non-yielding connection drawn tightly between said member and the rim, said connection being flexible before being tightened.

2. A resilient wheel including a hub, a rim, said hub having a flange provided with a series of spaced openings, a ring embracing the hub and provided with extensions disposed within the openings of the flange of the hub, a connection between the rim and said ring at different points throughout their circumferences, spokes supported by the hub, and springs interposed between said spokes and said rim.

3. A resilient wheel including a hub, a rim, a flange carried by said hub, said flange being provided with a plurality of apertures, a ring embracing the hub, projections carried by the ring and extending within the openings of the flange, hooks carried by the ring and disposed between said projections, a flexible member looped to embrace the hooks, and adjustably connected to the rim, spokes supported by the hub, and springs interposed between said spokes and the rim.

4. A resilient wheel including a hub, a rim, spokes pivotally supported by the hub, brackets mounted on said rim in spaced relation, said brackets being formed with converging side portions forming guideways, coil-springs provided terminally with plates disposed to be slid into the guideways of the brackets, and holding means arranged on the outer terminals of said spokes and embracing said springs.

5. A resilient wheel including a hub, a rim, spokes pivotally supported by the hub, members arranged on the outer terminals of said spokes, each of said members being formed with a threaded barrel which receives the terminal of the spoke, each member being provided with a plurality of slots which open through one of its ends, a plate forming a closure for the open end of said slots, brackets mounted on the rim, and springs terminally connected to said brackets, said springs being slidable into the slots formed in the members which receive the outer terminals of the spokes.

6. A resilient wheel including a hub, a rim, spokes connected to the hub, springs interposed between the spokes and rim, a member embracing the hub and spaced therefrom, and an adjustable non-yielding connection between said member and rim to center the member with respect to the rim.

7. A resilient wheel including a hub, a rim, brackets carried by the rim, spokes carried by the hub, springs engaging the free ends of the spokes and the brackets to connect the spokes and rim, a ring positioned about the hub, an adjustable connection between the ring and rim including a flexible member having loops engaging the ring and reverse loops disposed adjacent the brackets, and adjusting screws threaded through the brackets and engaging said latter loops.

8. A resilient wheel including a hub, a rim, brackets carried by the rim, spokes carried by the hub, springs engaging the free ends of the spokes and the brackets to connect the spokes and rim, a ring positioned about the hub, an adjustable connection between the ring and rim including a flexible member having loops engaging the ring and reverse loops disposed adjacent the brackets, and adjusting screws threaded through the brackets and engaging said latter loops, said adjusting screws having bifurcated ends to straddle the bight portions of the loops they engage.

In testimony whereof I affix my signature in presence of two witnesses.

ARTTURI JUTILA. [L. S.]

Witnesses:
JOHN ERICKSON,
MATT TOHILA.

Copies of this patent may be obtained for five cents each, by addressing the "Commissioner of Patents, Washington, D. C."